P. KÄMMER.
APPARATUS FOR LAVATORY INSTALLATIONS.
APPLICATION FILED FEB. 3, 1912.

1,027,342.

Patented May 21, 1912.

2 SHEETS—SHEET 1.

Witnesses:
L. Hoskinson
C. S. Brown

Inventor:
Paul Kämmer
by Foster Freeman Watson & Co't
Attorneys

P. KÄMMER.
APPARATUS FOR LAVATORY INSTALLATIONS.
APPLICATION FILED FEB. 3, 1912.

1,027,342.

Patented May 21, 1912.
2 SHEETS—SHEET 2.

Witnesses:
L. Hockinson
C. S. Brown.

Inventor:
Paul Kämmer
by Foster Freeman Watson & Coit
Attorneys

UNITED STATES PATENT OFFICE.

PAUL KÄMMER, OF ELBING, GERMANY.

APPARATUS FOR LAVATORY INSTALLATIONS.

1,027,342.    Specification of Letters Patent.    Patented May 21, 1912.

Application filed February 3, 1912. Serial No. 675,355.

*To all whom it may concern:*

Be it known that I, PAUL KÄMMER, a subject of the King of Prussia, and resident of 29/30 Innerer Mühlendamm, Elbing, West Prussia, German Empire, have invented certain new and useful Improved Apparatus for Lavatory Installations, of which the following is a specification.

This invention relates to an improved flushing apparatus for lavatory installations, latrines and the like and has for its object to provide means for preventing flooding of the installations in case of obstruction in the soil pipes. For this purpose I arrange a receptacle in the usual manner in connection with the soil pipes fitted with a float adapted to control the flush water regulating valve so as to open the flush water valve on the water attaining a predetermined level in said soil pipes.

According to the present invention the float is constructed of hollow form and is carried by a hollow spindle through which water from the soil pipes is adapted to enter upon the water attaining a predetermined level in said receptacle so as to cut off the flush water supply. The float is also provided with a siphon tube adapted to empty the hollow float on the removal of the obstruction in the soil pipes and thus enable the float to reopen the flush water supply valve. The float is also provided with a tube or its equivalent for the exit and entry of air from said hollow float. By this means the supply of flushing water is cut off on the level of the water in the soil pipes exceeding a predetermined level owing to the presence of obstructions in the soil pipes and furthermore the normal operation of the flushing apparatus again brought about on the removal of said obstructions.

In order that the invention may be more clearly understood, reference is made to the accompanying drawings which show by way of example the preferred method of carrying out the present invention.

Figure 1:
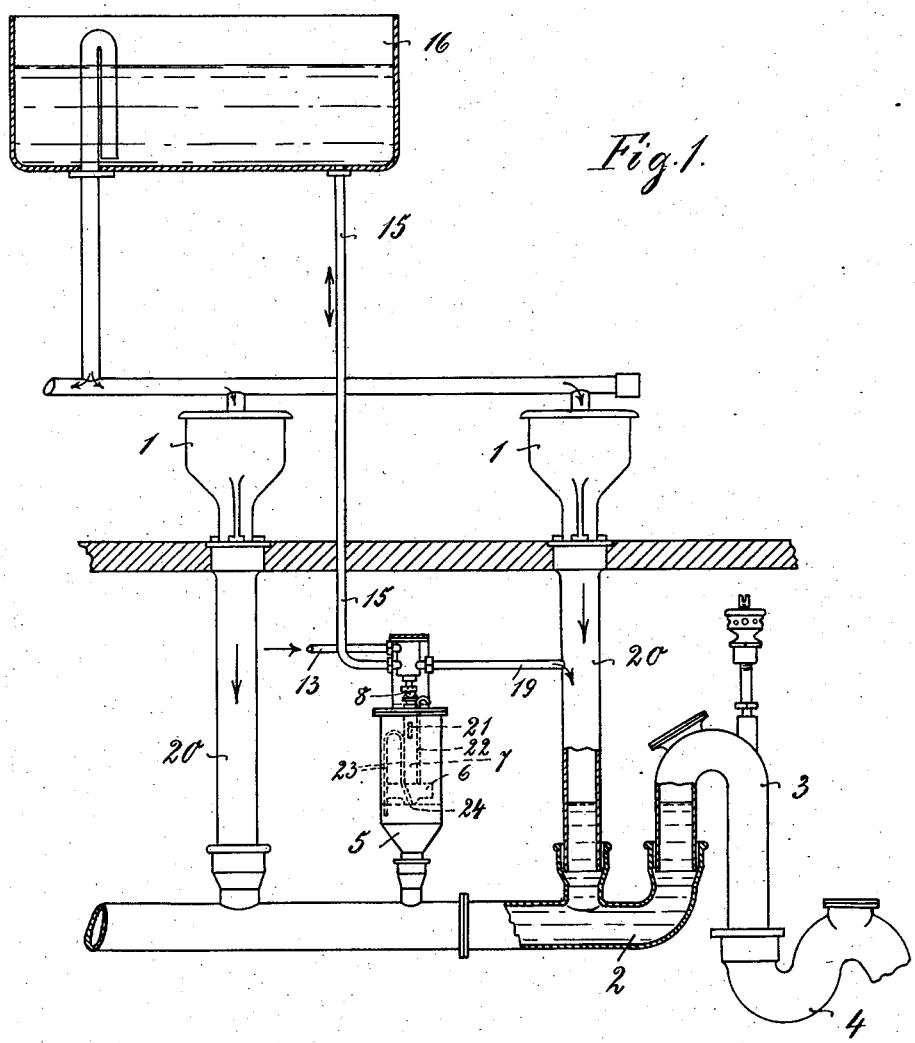
Figure 2:
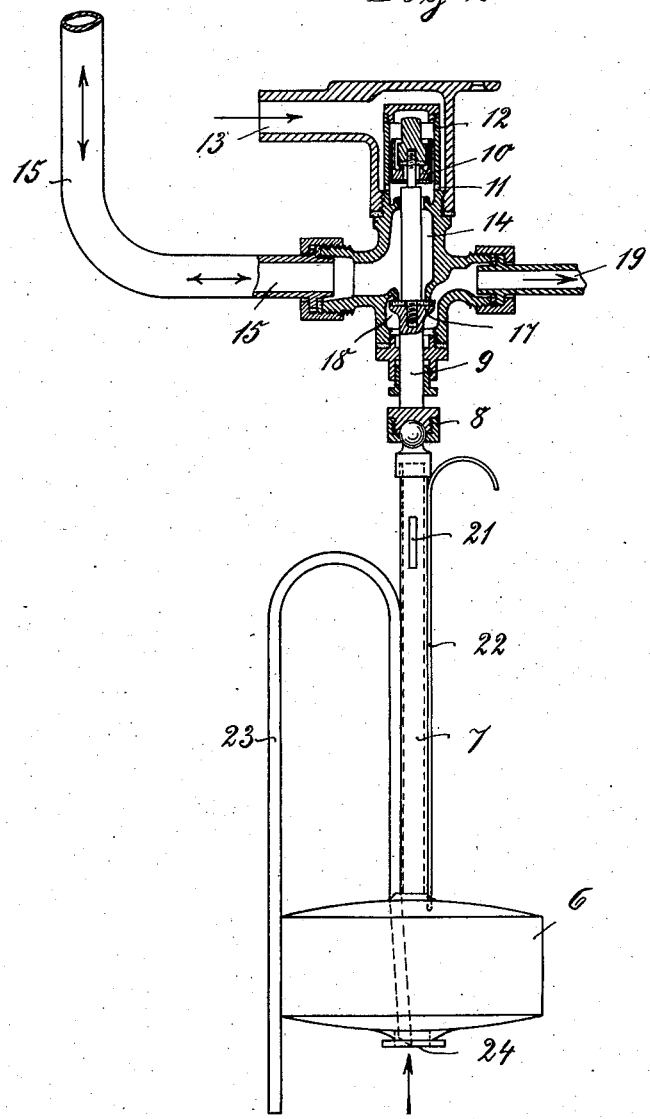

Figure 1 is a fragmentary view, partly in section, of a latrine constructed according to the present invention. Fig. 2 is a detail view of the float and flush water valve, the latter being illustrated in section.

The reference character 1 indicates the closet basins which are connected in the usual manner to a common soil pipe 2 having a siphon discharge pipe 3 and trap 4 of the usual construction. In connection with the soil pipe 2 is a receptacle 5 within which is arranged a hollow float 6 carried by means of a hollow spindle 7 whose upper end is connected by means of a ball joint 8 to the spindle 9 of the flush water controlling valve, which comprises a piston valve 10 adapted to control apertures 11 in a cylindrical valve casing 12 located in the end of the flush water supply pipe 13. The water entering through the aptreures 11 into the interior space 14 around the valve spindle 9 is adapted to escape through the uptake-pipe 15 to the flush water reservoir 16 which is adapted to distribute the flush water to the basins in the usual manner. The valve spindle 9 also carries a valve 17 adapted to control the communication between the valve space 14 and a second valve space 18 which is in communication with a pipe 19 connected to the fall pipes 20 connecting the closet basins 1 and soil pipe 2. The pipe 19 may however if desired be connected to any other suitable waste water outlet.

The hollow spindle 7 of the float 6 is provided with lateral apertures 21 at a suitable height through which water entering the receptacle 5 is adapted to enter, the air inclosed in the hollow float 6 escaping through an air tube 22 opening at one end into the float 6 and at its other end exteriorly of the receptacle 5, said air tube 22 being preferably soldered onto the spindle 7. The float 6 also carries a water siphon tube 23, one end of which enters the hollow float 6 and reaches into and opens into the bottom thereof, whereas its other end is adapted to open below the float into the water in the receptacle 5, while the crown of said siphon tube 23 is arranged at a somewhat higher level than the openings 21.

The bottom of the hollow float 6 may be provided with a central aperture adapted to be closed by means of a screw plug 24.

The operation of the foregoing apparatus is as follows: On the level of the water in the soil pipe 2 and fall pipes 20 attaining a predetermined level, the float 6 is raised by the water standing at the same level in the receptacle 5 and the piston valve 10 is consequently moved into its open position as shown in Fig. 2, in which position water is supplied from the pipe 13 to the pipe 15 and reservoir 16 and is then supplied therefrom in the usual manner for flushing purposes. At the same time the valve 17 cuts off connection between the pipes 15 and 19.

After the flushing operation, the level of the water in the soil pipe 2 again sinks, thus cutting off the flush water supply and at the same time opening communication between the pipes 15 and 19, thereby fully emptying the reservoir 16 and pipe 15 and preventing any possibility of the water freezing therein during frosty weather.

Should the soil pipe 2, siphon pipe 3 or trap 4 become obstructed, the level of the water in the fall pipes 20 and receptacle 5 rises until the water enters the interior of the float 6 through the apertures 21 and hollow spindle 22. The float thereupon sinks and consequently cuts off the flush water supply which has previously been opened by the raising of the float. Flooding of latrine is thereby prevented. On the removal of the obstruction, the level of the water in the receptacle 5 again sinks and under the siphonic action of the tube 23 the float 6 is emptied of water and is again capable of rising on the next increase of the level of water in the receptacle 5 so that the flushing apparatus is again brought into operation.

I claim:

1. In a lavatory installation having a flush water regulating valve controlled by means of a hollow float in a receptacle in connection with the soil pipe, a hollow spindle connecting said float with said valve, and having apertures at a predetermined level for the admission of water to the interior of said hollow float, means for the exit from and admission of air to the interior of said hollow float, and a siphon tube for withdrawing the water from the interior of said float.

2. In a lavatory installation having a flush water regulating valve, controlled by means of a hollow float in a receptacle in connection with the soil pipe, a hollow spindle connecting said float with said valve, and having apertures at a predetermined level for the admission of water to the interior of said hollow float, means for the exit from and for the admission of air to the interior of said float, and a siphon tube, one end of which opens into the bottom of and into the interior of said float while the other end of said siphon tube opens below said hollow float into said receptacle, and the crown of said siphon tube extending to a height above said apertures in said hollow spindle.

3. In a lavatory installation having a flush water regulating valve controlled by means of a hollow float in a receptacle in connection with the soil pipe, a hollow spindle connecting said float with said valve, and having apertures at a predetermined level for the admission of water to the interior of said hollow float, an air tube opening at one end into said hollow float and at its other end above said receptacle, and a siphon tube for withdrawing the water from the interior of said float.

In witness whereof I have hereunto set my hand in the presence of two witnesses.

PAUL KÄMMER.

Witnesses:
 GUST HOHMANN,
 MARTHA FRIESC.